(12) United States Patent
Taylor et al.

(10) Patent No.: US 11,515,065 B2
(45) Date of Patent: Nov. 29, 2022

(54) ELECTRICAL ISOLATOR

(71) Applicant: CROMPTON TECHNOLOGY GROUP, LTD., Solihull (GB)

(72) Inventors: Alexander Douglas Taylor, Exeter (GB); James William Bernard, Brackley (GB)

(73) Assignee: CROMPTON TECHNOLOGY GROUP, LTD., Solihull (GB)

( * ) Notice: Subject to any disclaimer, the term of this patent is extended or adjusted under 35 U.S.C. 154(b) by 426 days.

(21) Appl. No.: 16/707,316

(22) Filed: Dec. 9, 2019

(65) Prior Publication Data
US 2020/0321145 A1 Oct. 8, 2020

(30) Foreign Application Priority Data

Apr. 2, 2019 (EP) .................................... 19275038

(51) Int. Cl.
*H01B 17/34* (2006.01)
*B64D 45/02* (2006.01)
(Continued)

(52) U.S. Cl.
CPC ............. *H01B 17/34* (2013.01); *B64D 45/02* (2013.01); *F16L 25/01* (2013.01); *H01B 3/08* (2013.01); *H01B 3/48* (2013.01)

(58) Field of Classification Search
CPC . F16L 13/11; F16L 25/01; F16L 25/02; F16L 25/03; F16L 25/12; F16L 58/18;
(Continued)

(56) References Cited

U.S. PATENT DOCUMENTS 3,993,331 A * 11/1976 Schwarz ............... F16L 21/022
285/373
4,147,381 A * 4/1979 Schwarz ................ F16L 47/02
138/155
(Continued)

FOREIGN PATENT DOCUMENTS

EP 3153756 A1 * 4/2017 .............. F16L 25/01
WO 9837303 A1 8/1998
(Continued)

OTHER PUBLICATIONS

The Extended European Search Report for Application No. 19275038.8-1010; Report dated Sep. 30, 2019; Report Received Date: Oct. 3, 2019; 9 pages.

*Primary Examiner* — William H. Mayo, III
(74) *Attorney, Agent, or Firm* — Cantor Colburn LLP

(57) ABSTRACT

An isolator includes a first fluid-carrying member and a second fluid-carrying member; and a resistive, semi-conductive or non-conductive component located between the first and the second fluid-carrying member. The component conveys fluid flowing from the first fluid-carrying member to the second fluid-carrying member. The isolator further has a reinforcing composite encircling the first fluid-carrying member, the second fluid-carrying member and the component. The reinforcing composite having first fibers extending at an angle of between −30 degrees and +30 degrees to a longitudinal axis (A-A) of the resistive, semi-conductive or non-conductive component; second fibers interwoven with the first fibers and extending around the first fluid-carrying member, the second fluid-carrying member and the component at an angle of between +60 degrees and +90 degrees and/or between −60 degrees and −90 degrees to the longitudinal axis (A-A); and a resin.

15 Claims, 4 Drawing Sheets

(51) Int. Cl.
*F16L 25/01* (2006.01)
*H01B 3/08* (2006.01)
*H01B 3/48* (2006.01)

(58) Field of Classification Search
CPC ........ B64D 45/02; H01B 17/56; H01B 17/30; H01B 17/301
USPC ........ 285/27, 45, 65, 123.1, 123.12, 133.21, 285/151.1, 239, 285.1; 174/138 R, 68.1, 174/68.3, 137 R
See application file for complete search history.

(56) References Cited

U.S. PATENT DOCUMENTS

| | | | | |
|---|---|---|---|---|
| 4,398,754 | A | * | 8/1983 | Caroleo ................ F16L 25/021 285/107 |
| 5,131,688 | A | * | 7/1992 | Tricini ................ B29C 44/1295 285/294.2 |
| 9,618,148 | B2 | | 4/2017 | Breay et al. |
| 9,776,704 | B1 | | 10/2017 | Rufino et al. |
| 11,145,441 | B2 | * | 10/2021 | Faulkner ................ B64D 37/32 |
| 11,239,007 | B2 | * | 2/2022 | Faulkner ................ B64D 41/00 |
| 11,264,153 | B2 | * | 3/2022 | Faulkner ................ F16L 25/01 |
| 2008/0169643 | A1 | * | 7/2008 | Marban ................... F16L 25/03 285/48 |
| 2017/0103832 | A1 | | 4/2017 | Chase et al. |

FOREIGN PATENT DOCUMENTS

| | | | | |
|---|---|---|---|---|
| WO | WO 98/37303 | A * | 8/1998 | ............ E21B 17/20 |
| WO | 2009087372 | A1 | 7/2009 | |
| WO | 2011144440 | A1 | 11/2011 | |
| WO | WO 2011/144440 | A1 * | 11/2011 | .............. F16L 25/03 |

* cited by examiner

ELECTRICAL ISOLATOR

FOREIGN PRIORITY

This application claims priority to European Patent Application No. 19275038.8 filed Apr. 2, 2019, the entire contents of which is incorporated herein by reference.

FIELD

The present disclosure relates generally to an electrical isolator, and more specifically to an electrical isolator for use in a hydraulic fluid line for an aircraft. The electrical isolator may be used for connecting two fluid-carrying members such as pipes, hoses or tubes, for example pipes conveying hydraulic fluid.

BACKGROUND

Aircraft and other vehicles contain a large number of fluid conveying systems, in particular hydraulic systems that comprise fluid conveying components such as pipes. Such components are typically metallic and have good electrical conductivity.

Devices are incorporated into such systems to form electrical isolators between its metallic components. These isolators prevent build-up of electrostatic charge by safely dissipating static build up, and also prevent excessive electrical current flowing through the system, for example due to a lightning strike. Both of these events may cause a fire hazard if such isolators were not present in the system.

When incorporated into a fluid conveying system, the electrical isolator also needs to act as a safe passage for fluid. In certain systems, for example hydraulic systems or hydraulic fluid lines in an aircraft, the isolator needs to be able to withstand high pressures, in addition to other load and environmental factors.

The present disclosure is aimed at balancing the above factors to provide an electrical isolation function within a pressurised fluid system.

SUMMARY

In accordance with an aspect of the disclosure, there is provided an isolator comprising: a first fluid-carrying member and a second fluid-carrying member spaced apart from the first fluid-carrying member; a resistive, semi-conductive or non-conductive component located between the first and the second fluid-carrying member, wherein the resistive, semi-conductive or non-conductive component is adapted to convey fluid flowing from the first fluid-carrying member to the second fluid-carrying member; and a reinforcing composite encircling the first fluid-carrying member, the second fluid-carrying member and the resistive, semi-conductive or non-conductive component. The reinforcing composite includes first extending at an angle of between −30 degrees and +30 degrees to a longitudinal axis of the resistive, semi-conductive or non-conductive component and second fibers interwoven with the first fibers and extending around the first fluid-carrying member, the second fluid-carrying member and the resistive, semi-conductive or non-conductive component at an angle of between +60 degrees and +90 degrees to the longitudinal axis or between −60 degrees and −90 degrees to the longitudinal axis. The isolator can also include a resin.

In accordance with another aspect of the disclosure, there is provided a method of forming one or more electrical isolators, the method comprising: connecting a first fluid-carrying member to a second fluid-carrying member using a resistive, semi-conductive or non-conductive component such that the resistive, semi-conductive or non-conductive component is able to convey fluid flowing from the first fluid-carrying member to the second fluid-carrying member; providing interwoven first fibers and second fibers extending around the first fluid-carrying member, the second fluid-carrying member and the resistive, semi-conductive or non-conductive component. The first fibers extend at an angle of between −30 degrees and +30 degrees to a longitudinal axis of the resistive, semi-conductive or non-conductive component. The second fibers extend around the first fluid-carrying member, the second fluid-carrying member and the resistive, semi-conductive or non-conductive component at an angle of between +60 degrees and +90 degrees to the longitudinal axis and/or between −60 degrees and −90 degrees to the longitudinal axis. The method also includes adding a resin to the interwoven first fibers and second fibers; and curing the resin to form a reinforcing composite material.

The above isolator and method uses a reinforcing composite encircling the first fluid-carrying member, second fluid-carrying member and non-conductive component, whilst providing a conductive path through the reinforcing composite, but not the component sealing the two fluid-carrying members. This provides a device that effectively dissipates charge build-up and electrically isolates the junction between two fluid-conveying devices, whilst providing a strong joint to withstand high pressures.

Further, the provision of a reinforcing composite comprising interwoven first and second fibers in a resin provides a device that will perform well when subjected to impact. The weight and size of an isolator of this type may also be reduced relative to known isolators as fewer fibers may be required to form the reinforcing composite capable of withstanding required pressures. Manufacturing and materials costs may also be reduced due to the reduction in the quantity of fiber required when compared with previously known isolators.

Further, the isolator and the method described above do not require fibers to be placed using a filament winding technique. Because of this, the size and shape of the first and second fluid-carrying members is not limited by the required winding angle of helically wound fibres. Consequently, the shape of the first and second fluid-carrying members can be optimised for weight, size and pressure resistance of the isolator.

In any example of the disclosure, the first fibers may extend at an angle of between −5 degrees and +5 degrees to the longitudinal axis, more preferably at about 0 degrees to the longitudinal axis. This will further reduce the amount of fiber required in the reinforcing composite to be able to withstand a required pressure.

In any example of the disclosure, the first fibers may extend substantially perpendicular to the second fibers. Thus, the first fibers may extend substantially parallel to the longitudinal axis and the second fibers may extend substantially perpendicular thereto. In this arrangement, the fibers may extend both axially along the isolator and circumferentially around the isolator, thus providing good performance against both axial and radial loads.

Alternatively and in any example of the disclosure, the first fibers and the second fibers may form a triaxial braid. This may allow the isolator to be manufactured in a more time and cost effective manner as the formation of the triaxial braid may be automated and performed relatively quickly.

In the triaxial braid of the disclosure, the second fibers may comprise fibers extending at an angle of between +70 degrees and +80 degrees to the longitudinal axis and fibres extending at an angle of between −70 degrees and −80 degrees to the longitudinal axis.

In any example of the disclosure, a radially outer surface of the reinforcing composite may be substantially smooth. This will make the detection of Barely Visible Impact Damage (BVID) relatively easy compared to a rougher surface finish such as the surface finish which would typically result from a filament winding process.

In accordance with an aspect of the disclosure, there is provided a hydraulic system or hydraulic fluid line, for example in an aircraft, comprising an electrical isolator as described above. It has been found that the technology described herein is particularly suitable for electrically isolating components under a high pressure, for example that experienced in a hydraulic system, such as greater than 1000, 2000, 3000, 5000 or 8000 psi. In other aspects there is provided a fuel system or fuel line, for example in an aircraft, comprising an electrical isolator as described above.

In one example of the method of the disclosure, the providing interwoven first fibers and second fibers extending around the first fluid-carrying member, the second fluid-carrying member and the resistive, semi-conductive or non-conductive component may comprise: weaving the first fibers and the second fibers to form a mesh of interwoven fibers; and wrapping the mesh of interwoven fibers around the first fluid-carrying member, the second fluid-carrying member and the resistive, semi-conductive or non-conductive component.

In an alternative example of the method of the disclosure, the providing interwoven first fibers and second fibers extending around the first fluid-carrying member, the second fluid-carrying member and the resistive, semi-conductive or non-conductive component may comprise: braiding the first fibers and the second fibers to form a triaxially braided tube; and placing the triaxially braided tube over the first fluid-carrying member, the second fluid-carrying member and the resistive, semi-conductive or non-conductive component, or braiding the first fibers and the second fibers in situ to form a triaxially braided tube extending around the first fluid-carrying member, the second fluid-carrying member and the resistive, semi-conductive or non-conductive component.

In any example of the method of the disclosure, the adding a resin to the interwoven first fibers and second fibers may comprise: placing a mold around the mesh of interwoven first and second fibers, the first fluid-carrying member, the second fluid-carrying member and the resistive, semi-conductive or non-conductive component; and injecting a resin into the mould.

In any example of the method of the disclosure, the method may further comprise providing a gap between an inner surface of the mold and the interwoven first and second fibers. The provision of the gap may enable resin to travel along the full longitudinal extent of the mold and around the full circumference of the mold to substantially fill the gap prior to then flowing radially through the interwoven fibers. This will reduce the amount of fiber which the resin will travel through when flowing into and through the interwoven fibers. Thus, any additive in the resin is less likely to be filtered out from the resin by the fibers such that the conductive or other properties of the resin once in situ in the reinforcing composite material may be more uniform across the extent thereof.

In addition, the provision of the gap will allow a resin-rich or pure resin outer layer or surface to be provided in the reinforcing composite formed using a mold according to the disclosure. This will enable a smooth surface to be formed on the outer surface of the reinforcing composite material as described further below.

To further aid in forming a smooth outer surface on the reinforcing composite material, the method may preferably further comprise providing a substantially smooth inner surface on the mold such that a radially outer surface of the reinforcing composite material is substantially smooth.

In any example of the method of the disclosure, the resin may be injected into the mold under pressure and/or under a vacuum. This will cause the resin to more effectively flow into the mold along the full longitudinal and circumferential extent thereof and then to penetrate radially into and through the interwoven first and second fibers.

The provision of the interwoven first and second fibers may be sufficient to provide a required pressure resistance of a reinforcing composite according to the disclosure. If a high pressure resistance is required for a low weight of material, the method may further comprise winding third fibers around the interwoven first and second fibers prior to adding the resin, wherein the third fibers extend at an angle of between 80 and 100 degrees to the longitudinal axis.

The fiber and resin mixture may be placed directly onto the first fluid-carrying member, the resistive, semi-conductive or non-conductive component and the second fluid-carrying member. The method may comprise applying a surface treatment, for example a conductive surface treatment to the first and second fluid-carrying members, and the fiber and resin mixture may be placed directly onto the surface treatment of the first fluid-carrying member, the resistive, semi-conductive or non-conductive component and the second fluid-carrying member. By "directly onto" it is meant that no other material is present between the first fluid-carrying member, the resistive, semi-conductive or non-conductive component, the second fluid-carrying member and the fiber and resin mixture.

In any of the aspects of embodiments described herein, the first fluid-carrying member and the second fluid-carrying member may be configured to carry or convey fluid, and are not limited to any specific geometry or cross-section.

The reinforcing composite encircles the first and second fluid-carrying members, but typically just the end portions thereof, e.g. closest to the resistive, semi-conductive or non-conductive component. The reinforcing composite may be a continuous tube that extends from the first fluid-carrying member (or an end portion thereof) and over the resistive, semi-conductive or non-conductive component to the second fluid-carrying member (or an end portion thereof).

The reinforcing composite may have a varying cross-sectional area and/or inner diameter and/or outer diameter. Alternatively, the reinforcing composite may have a constant or substantially constant cross-sectional area and/or inner diameter and/or outer diameter and/or thickness. The cross-sectional area of the reinforcing composite may not change by more than 5%, 10%, 15%, 20%, 30%, 40%, 50%, 100%, 200%, 300%, 400% or 500% over the course of its length.

The reinforcing composite may comprise a conductive additive and this means that the composite can provide a conductive path between the first fluid-carrying member and the second fluid-carrying member. The conductive additive may be present in the resin mixture in an amount up to or at least 30%, 20%, 10%, 5%, 2% or 1% of the resin mixture by weight or volume. The resin and/or fiber may be present in the reinforcing composite in an amount up to or at least 30%, 40%, 50%, 60%, 70%, 80% or 90% of the reinforcing composite by weight or volume. In one preferred example, the fiber may be present in the reinforcing composite in an amount up to 70% of the reinforcing composite by weight or volume, and more preferably in an amount of between 40% and 60% of the reinforcing composite by weight or volume.

The reinforcing composite may directly contact the first fluid-carrying member and the second fluid-carrying member. Alternatively, a surface treatment, for example a conductive surface treatment, may be provided on or applied to the first fluid-carrying member and/or the second fluid-carrying member and the reinforcing composite may contact this surface treatment, whilst still encircling the first fluid-carrying member and the second fluid-carrying member.

The first fluid-carrying member and/or second fluid-carrying member and/or resistive, semi-conductive or non-conductive component and/or reinforcing composite may be tubular. The first fluid-carrying member and/or second fluid-carrying member and/or resistive, semi-conductive or non-conductive component and/or reinforcing composite may each have substantially the same cross-section, for example circular cross-section.

Alternatively, the first fluid-carrying member and/or second fluid-carrying member and/or resistive, semi-conductive or non-conductive component and/or reinforcing composite may each have other shapes and cross-sections, such as a square, rectangular, triangular or irregular cross-section.

The diameter of the first fluid-carrying member and/or second fluid-carrying member and/or resistive, semi-conductive or non-conductive component and/or reinforcing composite may be at least or no more than 5 mm, 10 mm, 15 mm, 20 mm, 25 mm, 30 mm, 35 mm, 40 mm, 45 mm, 50 mm, 60 mm, 70 mm, 80 mm, 90 mm or 100 mm.

The thickness of the first fluid-carrying member and/or second fluid-carrying member and/or resistive, semi-conductive or non-conductive component and/or reinforcing composite may be at least or no more than 1 mm, 2 mm, 3 mm, 4 mm, 5 mm or 10 mm.

The first fluid-carrying member, the second fluid-carrying member and the resistive, semi-conductive or non-conductive component may have a substantially constant internal diameter. This can reduce the amount of sloshing that fluid experiences as it travels through the isolator, in turn reducing build-up of static charge.

The first fluid-carrying member and/or the second fluid-carrying member may comprise one or more protrusions on an outer surface thereof, and the reinforcing composite may extend over and enclose, encase or cover the one or more protrusions. The one or more protrusions may be annular or irregular.

The first fluid-carrying member and the second fluid-carrying member may be metallic.

The first fluid-carrying member, the second fluid-carrying member, and the resistive, semi-conductive or non-conductive component may be coaxial with one another.

The fiber may comprise glass fiber, carbon fiber or aramid fibers. More preferably, where a lower conductivity fiber may be required, the fiber may comprise glass fiber or aramid fibers.

The conductive additive may comprise carbon black or carbon nanotubes.

In one preferred example in which the conductive additive comprises carbon black, the carbon black may be present in the resin mixture in an amount of between 1% and 6% of the resin mixture by weight or volume.

In an alternative preferred example in which the conductive additive comprises carbon nanotubes, the carbon nanotubes may be present in the resin mixture in an amount of between about 0.1% and 0.6% of the resin mixture by weight or volume.

The resin mixture may comprise a resin that may be of thermoset (e.g. epoxy) or thermoplastic (e.g. polyether ether ketone—"PEEK") construction.

It is envisaged that the material between the various parts of the electrical isolator described above, for example between the reinforcing composite and the first fluid-carrying member and/or second fluid-carrying member and/or resistive, semi-conductive or non-conductive component, will be minimal, and may only comprise materials, e.g. surface treatments of nominal thickness, for example not exceeding a thickness of 5 mm, 2 mm, 1 mm, 0.5 mm or 0.25 mm.

No air gap or other material may be present between the reinforcing composite and the first fluid-carrying member, the second fluid-carrying member and the resistive, semi-conductive or non-conductive component.

BRIEF DESCRIPTION OF THE DRAWINGS

Various embodiments will now be described, by way of example only, and with reference to the accompanying drawings in which.

DETAILED DESCRIPTION

The present disclosure relates to electrical isolators, which may be used in aircraft hydraulic systems or hydraulic fluid lines in order to provide a strong fluid carrying structure whilst controlling induced electric current (e.g. by lightning) and dissipation of electrostatic charge.

Figure 1:
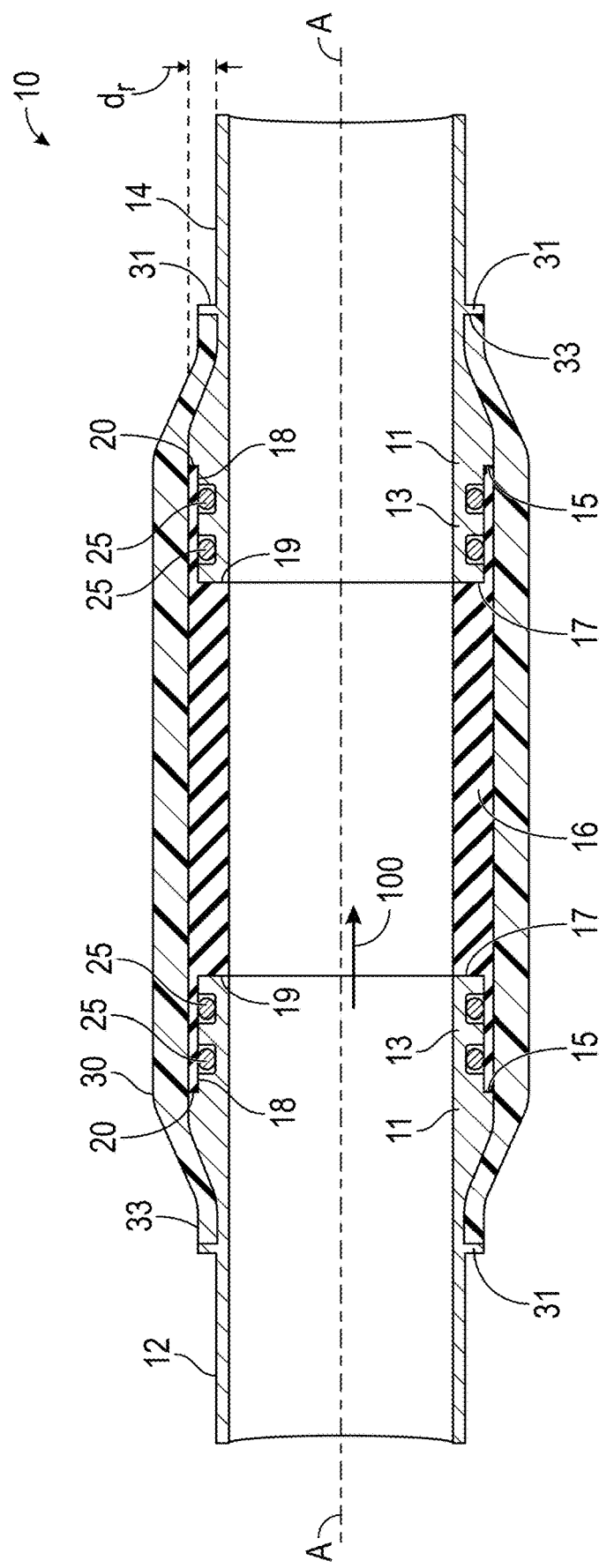
FIG. 1 shows a cross-section of an electrical isolator in accordance with an example of the present disclosure.

FIG. 1 shows a cross-section of an electrical isolator or fluid carrying element 10 according to an embodiment of the present disclosure.

The electrical isolator 10 forms part of a fluid conveying network, such as a hydraulic fluid network in an aircraft. Fluid, for example hydraulic fluid, may flow through the electrical isolator 10 in the direction of arrow 100.

The electrical isolator 10 comprises a first fluid-carrying member or pipe 12 and a second fluid-carrying member or pipe 14. Both the first pipe 12 and the second pipe 14 may be metallic. In the illustrated example, the first pipe 12 and the second pipe 14 have the same structure. The first and second pipes 12, 14 are opposed and spaced apart from one another to provide a gap there between.

In the illustrated example the first pipe 12 and second pipe 14 are tubular, i.e. cylindrical in shape and having a circular cross-section. Other shapes and cross-sections are possible. Whilst in FIG. 1 the first pipe 12 and second pipe 14 are shown as coaxial extending about an axis A-A, this is not essential and examples are envisaged in which the axes of the first pipe 12 and second pipe 14 are at an angle with respect to each other. The angle may be less than 90, 60, 30, 15, 10 or 5 degrees, for example.

Both the first pipe 12 and the second pipe 14 terminate in a shoulder portion 11. The shoulder portion 11 has an increased outer diameter and/or thickness compared to the portion of the respective pipe 12, 14 that is adjacent to it. The shoulder portion 11 comprises a radial surface 15 and an annular flange 13 extending axially from the radial surface 15. Each annular flange 13 terminates at a respective radial surface 17.

A resistive, semi-conductive or non-conductive component or liner 16 is located between the first pipe 12 and the second pipe 14. The liner 16 connects the first pipe 12 to the second pipe 14 and maintains a fluid path (see arrow 100) there between. The liner is shown as tubular in FIG. 1, and coaxial with the first pipe 12 and second pipe 14. Other configurations are possible, for example if the axes of the first pipe 12 and second pipe 14 are at an angle with respect to each other as discussed above. The liner 16 is resistive, semi-conductive or non-conductive such that it does not itself conduct or transfer electric current between the first pipe 12 and the second pipe 14.

Each axial end of the liner 16 comprises a radial surface 19 and an annular flange 18 extending axially from the radial surface 19 (i.e. extending perpendicular to the axis A of the liner 16). The annular flanges 18 of the liner 16 terminate at radial surfaces 20.

The respective flanges 13 of the first pipe 12 and second pipe 14 are configured to fit and/or slide into respective flanges 18 of the liner 16. Alternatively, the respective flanges 18 of the liner 16 may be configured to fit and/or slide into the respective flanges 13 of the first pipe 12 and the second pipe 14. As such, the radial surfaces 17 of the first pipe 12 and second pipe 14 contact and oppose the radial surfaces 19 of the liner 16. Similarly, the radial surfaces 15 of the shoulder portion 11 contact and oppose the radial surfaces 20 of the annular flanges 18 of the liner 16. It will be understood that the liner 16 and the shoulder portions 11 could be configured in any other way which allows the liner 16 to be sealed against the shoulder portions 11 of the first and second pipes 12, 14.

The inner diameter of the liner 16 may be the same as that of the first pipe 12 and the second pipe 14. This can assist in reducing disturbances to fluid flowing through the electrical isolator 10.

The shoulder portions 11 of the first pipe 12 and/or second pipe 14 may be shaped so as to taper from a relatively small outer diameter to a relatively large outer diameter, when moving towards the end of the respective pipe 12, 14 (or towards the liner 16). The shoulder portions 11 thus form a tapered projection that comprises a ramp whose outer diameter increases when moving towards the end of the respective pipe 12, 14 (or towards the liner 16). The ramp may terminate at the radial surface 15, which may define the point at which the shoulder portions 11 have the largest outer diameter.

The outer diameter of the liner 16 may be the same as that of the shoulder portions 11 of the first pipe 12 and second pipe 14, for example where the ramp terminates at the radial surface 15. This creates a smooth transition from the outer surface of the liner 16 to the outer surface of the first pipe 12 and second pipe 14.

The liner 16 is fluidly sealed against both the first pipe 12 and the second pipe 14 using one or more sealing members 25. In the illustrated embodiment, the sealing members 25 are annular "O" rings and two are provided for sealing each of the first pipe 12 and the second pipe 14. The annular rings sit within respective grooves on the annular flanges 13 of the first pipe 12 and second pipe 14. It would be possible to use other amounts or types of seal and in other arrangements, for example provide the grooves on the annular flanges 18 of the liner 16 instead.

In accordance with the present disclosure, a reinforcing composite 30 is located around the first pipe 12, the second pipe 14 and the liner 16. The reinforcing composite comprises fiber and a resin mixture. The fiber may be glass fiber, carbon fiber or aramid fiber. In one preferred example, the fiber may be $S^2$ glass fiber. The resin mixture may comprise a resin that may be of thermoset (e.g. epoxy) or thermoplastic (e.g. polyether ether ketone—"PEEK") construction. In one preferred example, the resin may be epoxy resin.

The reinforcing composite 30 may consist of, or consist essentially of the fiber and resin mixture. The reinforcing composite 30 may be continuous and cover all of the first pipe 12, second pipe 14 and liner 16 with no air gap and/or other material in between. The first pipe 12 and second pipe 14 may comprise a surface coating or treatment, and the surface coating or treatment may be the only material between the first pipe 12 or second pipe 14 and the reinforcing composite 30.

The reinforcing composite 30 extends axially past the shoulder portions 11 of the first pipe 12 and the second pipe 14. As such, the internal diameter of the reinforcing composite 30 decreases as the reinforcing composite 30 extends over and hugs the tapering surface of the first and second pipes 12, 14 at the shoulder portion 11.

Due to the reinforcing composite 30 extending axially past the shoulder portion 11, the smallest internal diameter of the reinforcing composite 30 (i.e. past the shoulder portion 11) may be less than the largest outer diameter of the first pipe 12 and the second pipe 14 (i.e. at the shoulder portion 11). In this manner, the first pipe 12, second pipe 14 and the liner 16 may be held captive by the reinforcing composite 30.

Alternatively, or additionally the shoulder portion 11 of the first pipe 12 and/or the second pipe 14 may comprise a protrusion, over which the reinforcing composite extends. Alternatively, or additionally, a respective annular protrusion 31 may be provided extending radially outwardly from the radially outer surface of each of the first and second pipes 12, 14, the annular protrusions 31 being positioned such that a radial end face 33 at each axial end of the reinforcing composite 30 may abut against and be held in place by the respective annular protrusion 31.

The resin mixture comprises a conductive additive, for example carbon black, graphene and/or carbon nanotubes, and this can be incorporated into the resin mixture in varying amounts to achieve the desired conductivity for a particular application.

Alternatively, or additionally the desired conductivity could be achieved by varying the amount of fiber or resin mixture in the composite 30. It will be appreciated that the conductivity of the composite 30 is a function of the relative amounts of fiber, resin and additive and these amounts could be varied to provide any desired conductivity. The conductive additive may be present in the resin mixture in an amount between 0-10 wt. %.

The reinforcing composite allows the electrical isolator to withstand the high internal pressures to which it will be subjected when used in a hydraulic system without leaking. To achieve the best resistance to both the radial and axial forces exerted on the electrical isolator, the reinforcing composite has traditionally been formed to comprise fibers wound circumferentially around the pipes and the resistive, semi-conductive or non-conductive component (for the radial forces) and fibers wound helically around the pipes and the resistive, semi-conductive or non-conductive component (for the axial forces and some radial force). Typically, the fibers are wound around the pipes and the resistive, semi-conductive or non-conductive component using a filament winding process.

The layer of circumferentially wound fiber (also referred to as "hoop" fiber) provides additional pressure resistance to the electrical isolator. Hoop fiber is wound with a high angle to the axis of the structure such that it is wound in a very tight helix (or in some cases, even wound directly over itself, i.e. at ninety degrees to the axis). As such, hoop fiber cannot expand under radial pressure and is therefore strong against radial loads, i.e. it is pressure resistant. Such an electrical isolator with a layer of hoop fiber is better adapted to the high pressures of hydraulic systems.

While circumferential fiber is well-suited to providing pressure resistance, it is not well-suited to holding the electrical isolator together under axial loading as it does not provide much strength in the axial direction. However, the layer of helical wound fiber does provide axial strength.

Circumferential fiber here means fiber with a high winding angle (the angle that the fiber makes with the axis of the part (usually mounted on a mandrel) during winding), typically from 80 degrees up to 90 degrees, more preferably at least 85 degrees.

Helical fiber here means fiber with a low winding angle, typically between 30 degrees and 70 degrees. It is often difficult to wind fiber at angles below about 30 degrees, while angles above 70 degrees do not provide the required axial strength.

Figure 2:
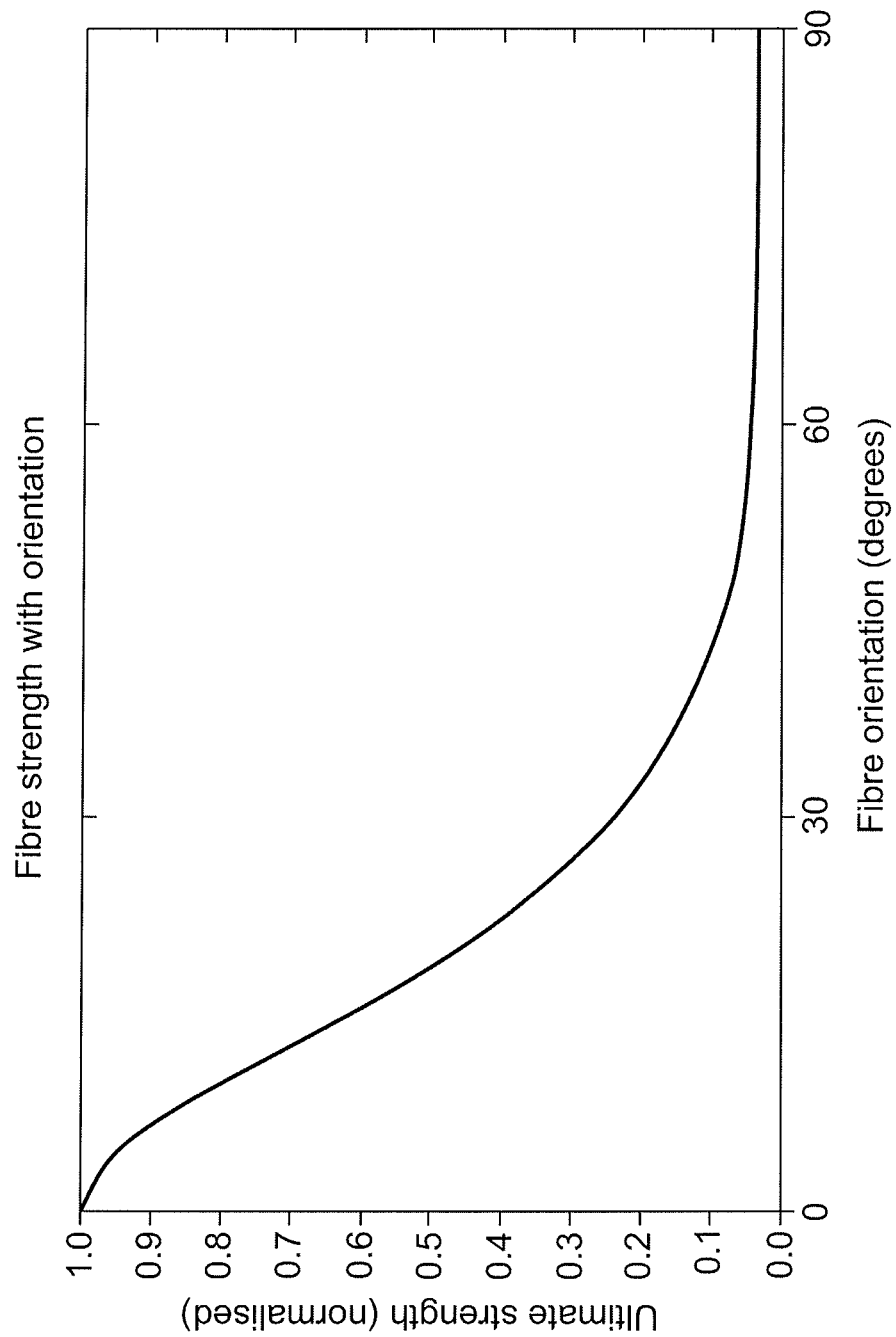
FIG. 2 shows the ultimate normalized strength of a reinforcing composite when in tension relative to the angle of helically extending fiber in the composite.

FIG. 2 is a graph showing the normalised ultimate strength (i.e. the relative strength) in tension of a reinforcing composite comprising fiber extending in both hoop and helical orientations relative to the angle of the helical fiber in the composite. The data was obtained by testing tubular test coupons of reinforcing composite material and tested using the Standard Test Method for Apparent Hoop Tensile Strength of Plastic or Reinforced Plastic Pipe, ASTM D2290, and the Standard Test Method for Transverse Tensile Properties of Hoop Wound Polymer Matrix Composite Cylinders, ASTM D5450.

As seen, the relative strength of the composite material in tension increases from about 0.05 for a fiber angle of 60 degrees to about 0.1 for a fiber angle of about 42 degrees and then increases gradually more steeply to a relative strength of about 0.25 for a fiber angle of 30 degrees, about 0.6 for a fiber angle of about 15 degrees and a relative strength of 1 for a fiber angle of 0 degrees. By providing fibers which extend closer to parallel to the longitudinal axis of the isolator (and preferably at near to 0 degrees relative thereto) therefore, it is possible to reduce the size and weight of the isolator produced as fewer will be required to provide the required strength of reinforcing composite. The cost of producing the isolator may also be reduced as using fewer fibers may reduce the time taken to manufacture the reinforcing composite material and may reduce the cost of the materials used in the reinforcing composite material.

However, it is not possible to achieve fiber angles below about 30 degrees in an isolator according to the disclosure when using a filament winding process, as the angle achievable is limited by the radial distance dr between the radially outer surface of the first or second pipe 12, 14 and the radially outer surface of the resistive, semi-conductive or non-conductive component together with the friction coefficient between the wet fibers to be wound and the surface around which they are to be wound. If the radial distance dr is increased to allow a fiber angle of less than 30 degrees to be achieved, this will result in an undesirable increase in weight (due to an increase in the volume of materials used). Further, an isolator in which the radial distance is increased in this way may be too large for the envelope allocated to it in use (in an aircraft for example).

It is desirable to provide a reinforcing composite for an isolator which can withstand the high pressures to which the isolator according to the disclosure is subjected while minimising both the weight and the envelope or diameter of the reinforcing composite. In various examples, this may be achieved by providing a reinforcing composite comprising interwoven fibers rather than filament wound hoop and helical fibers as described above.

Figure 3:
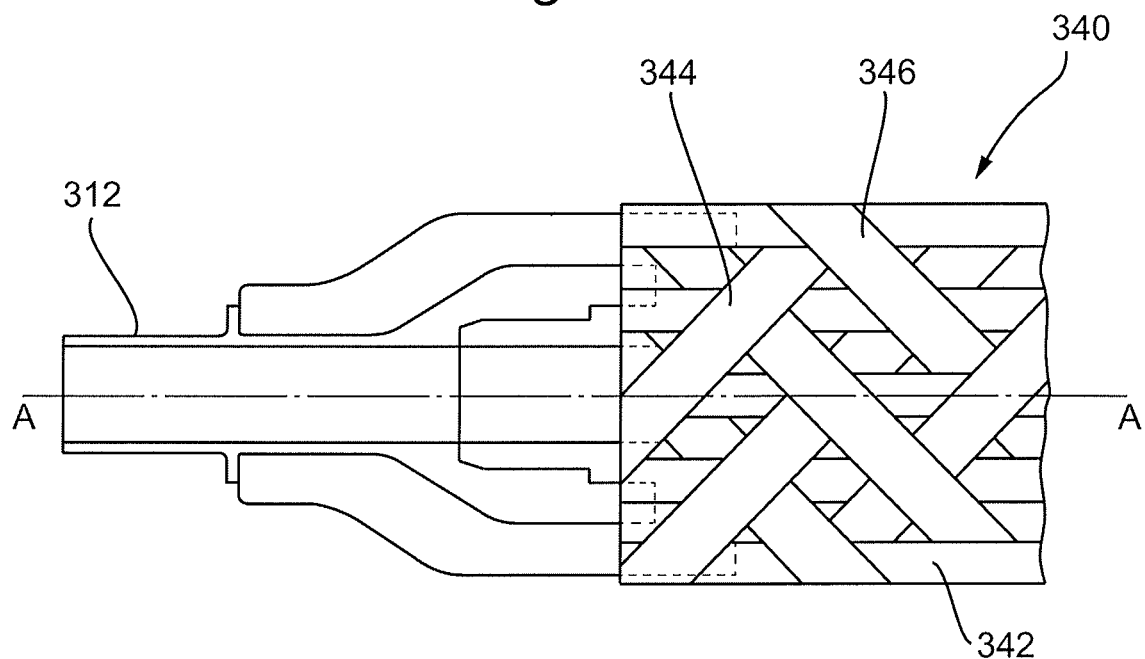
FIG. 3 schematically shows a triaxially braided fiber tube according to an example of the disclosure extending over part of an electrical isolator.

In one example of the disclosure as shown in FIG. 3, the reinforcing composite may comprise a triaxially braided tube 340 formed from $S^2$ glass fiber. As seen in FIG. 3, the triaxially braided tube 340 is adapted to extend around and to be in contact with the radially outer surface of the liner (not shown) and the radially outer surface of the first and second pipes 312, not shown. The triaxially braided tube 340 may comprise 3 sets of fibers braided or plaited together to form a tube or sock as is known in the art of composite materials. The triaxially braided tube 340 may comprise a first group of fibers 342 extending in a substantially axial direction, i.e. at about 0 degrees relative to the longitudinal axis of the isolator, a second group of fibers 344 extending at about 75 degrees relative to the longitudinal axis of the isolator, and a third group of fibers 346 extending at about −75 degrees or 285 degrees relative to the longitudinal axis of the isolator. The first, second and third groups of fibers 342, 344, 346 are interwoven to form the triaxially braided tube 340. In any example of the disclosure, the first group of fibers 342 could extend at an angle of between −10 and 10 degrees, or more preferably between −5 and 5 degrees relative to the longitudinal axis of the isolator. In any example of the disclosure, the second group of fibers 344 could extend at an angle of between 60 and 90 degrees relative to the longitudinal axis of the isolator. In any example of the disclosure, the third group of fibers 346 could extend at an angle of between −60 and −90 degrees (300 and 270 degrees) relative to the longitudinal axis of the isolator. Using current braiding machines, it is not normally efficient to braid the second and third groups of fibers at an angle of more than +/−75 degrees relative to the longitudinal axis of the isolator.

It will be appreciated that the relative quantities and angles of the first, second and third groups of fibers in the triaxially braided tube 340 could be varied to meet the design requirements of a particular isolator.

In one example, the triaxially braided tube 340 may be pre-formed and then slid over the radially outer surface of the liner (not shown) and the radially outer surface of the first and second pipes (312, not shown) when assembling the isolator. Alternatively, the triaxially braided tube 340 may be formed by braiding directly around the radially outer surface of the liner and the radially outer surface of the first and second pipes 312, not shown, when assembling the isolator.

Figure 4:
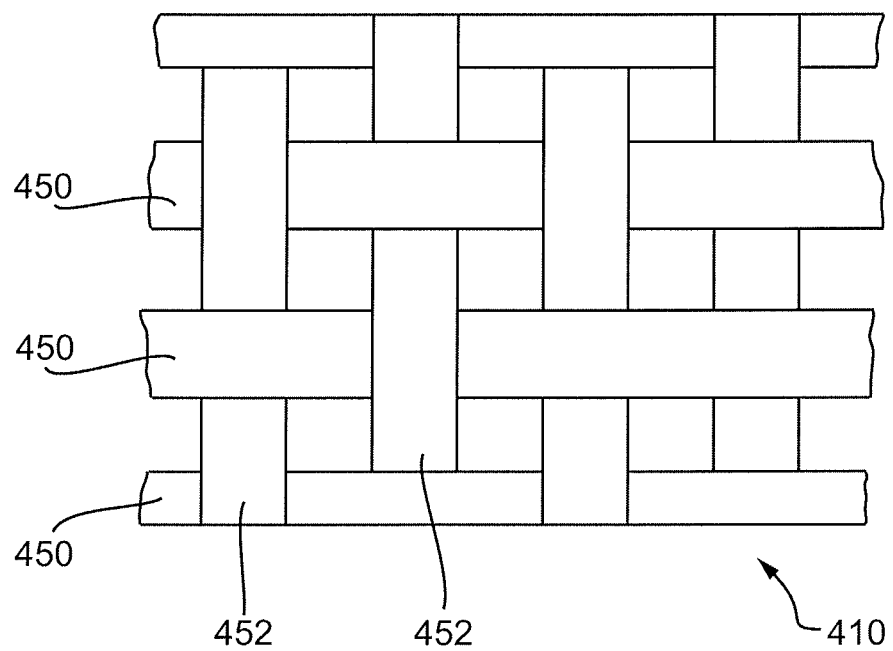
FIG. 4 schematically shows an example of biaxially woven fibers for use in an electrical isolator according to the disclosure.

In another example of the disclosure as shown in FIG. 4, the reinforcing composite may comprise glass fibers woven into a biaxially woven fabric or mesh 410 such that a first group of fibers 450 extending at about 0 degrees or substantially parallel to the longitudinal axis of the isolator are interwoven with a second groups of fibers 452 extending at about 90 degrees or substantially perpendicular to the longitudinal axis of the isolator. In one example of the disclosure, the biaxially woven fabric such as that shown in FIG. 4 could be wound directly around the radially outer surface of the liner 16 and the radially outer surface of the first and second pipes 12, 14 as shown in FIG. 1.

As the reinforcing composite material of the present disclosure is not formed by filament winding of fibers but rather by placing or winding pre-woven fibers around the outer surface of the liner 16 and the radially outer surface of the first and second pipes 12, 14, the taper angle of the shoulder portions 11 of the first and second pipes 12, 14 does not dictate the angle at which the fiberes are wound around the outer surface of the liner 16 and the radially outer surface of the first and second pipes 12, 14. Consequently, the shape of the shoulder portions 11 can be designed to optimize performance of the isolator. Thus, the weight of the isolator can potentially be reduced by decreasing the amount of metal or other material used in the shoulder portions 11.

In any example of the disclosure, if necessary to increase the strength of the reinforcing composite 30 against radial loads, additional fibers (such as glass fibers for example) may be circumferentially wound over the triaxially braided tube 340 or the biaxially woven fabric 410. This may be most beneficial when used with a triaxially braided material in which there are no fibers extending perpendicular or at about 90 degrees to the longitudinal axis of the isolator, as in the triaxially braided tube 340 of FIG. 3. In certain examples in which the isolator may be subjected to high radial loads, the additional circumferentially wound fibers may allow less interwoven fibers to be used in the triaxially braided tube or biaxially woven fabric to achieve a required radial strength, thus reducing the time taken to manufacture the reinforcing composite and also reducing the weight and cost thereof.

In any of the examples described above, the reinforcing composite 30 also comprises a resin such as an epoxy resin.

The features discussed above provide an electrical isolator achieving a balance of controlling electric current and dissipating electric charge, whilst also being capable of withstanding high pressures. The issue of high fluid pressure is particularly important when incorporating an electrical isolator in a hydraulic fluid line, for example that of an aircraft, which typically operate at a higher pressure, for example greater than 3000 psi, than for example fuel lines, which operate at pressures of about 100 psi.

This can be used in pressurized fluid systems that require controlled electrical resistance. The electrical isolators described herein achieve robust static sealing, resilience to fatigue, electrical continuity.

Use of a conductive reinforcing composite as disclosed herein removes the need for conductive leads that are exhibited in conventional arrangements. At the same time, the arrangements of the present disclosure remove the need for adhesive and surface preparation, unlike adhered bonds which can be hard to manufacture. Using a conductive additive in the resin also means that the resistivity (or conductivity) of the electrical isolator can be tuned during production, by simply varying the amount of conductive additive in the resin.

A method of forming the electrical isolator 10 of FIG. 1 will now be described. The first pipe 12 and the second pipe 14 may be provided. The first pipe 12 and/or second pipe 14 may form part of a pipe network, or each comprise the end portion of a larger pipe. The electrical isolator 10 may be part of a hydraulic pipe network operating at greater than 1000, 2000 or 3000 psi, for example a hydraulic system or hydraulic fluid pipe in an aircraft.

Ring seals 25 are inserted into respective grooves on the first pipe 12 and second pipe 14. The ends of the first pipe 12 and the second pipe 14 may then be brought close to one another, and the resistive, semi-conductive or non-conductive component or liner 16 may be placed there between. The annular flanges 13 of the first pipe 12 and second pipe 14 may be inserted into (or over) the corresponding annular flanges 18 of the liner 16. This forms a connection between the first pipe 12 and the second pipe 14.

Due to the presence of seals 25, the liner 16 is fluidly sealed against the first pipe 12 and the second pipe 14. This allows fluid to flow or be conveyed from the first pipe 12 to the second pipe 14.

In order to provide reinforcement, a reinforcing composite 30 is located around the first pipe 12, the second pipe 14 and the liner 16. The composite 30 may be continuous and contact all of the first pipe 12, second pipe 14 and the liner 16.

In one example of the disclosure, the reinforcing composite may comprise a triaxially braided tube 340 formed from $S^2$ glass fibre as shown in FIG. 3. The triaxially braided tube may be pre-formed using a triaxial braiding machine as known in the art.

The triaxially braided tube 340 may be slid over the radially outer surface of the liner 16 and the radially outer surface of the first and second pipes 12, 14 when assembling the isolator. In an alternative example, the triaxially braided tube 340 may be formed by braiding directly around the radially outer surface of the liner 16 and the radially outer surface of the first and second pipes 12, 14 (i.e. by braiding in-situ) using a known triaxial braiding machine.

In another example of the disclosure glass fibers may be woven into a biaxially woven fabric or mesh 410 such as that shown in FIG. 4. In one example of the disclosure, the biaxially woven fabric 410 may be wound directly around the radially outer surface of the liner 16 and the radially outer surface of the first and second pipes 12, 14. In an alternative example, the biaxially woven fabric 410 may be cut to a desired width and then circumferentially wound around the radially outer surface of the liner 16 and the radially outer surface of the first and second pipes 12, 14.

In any example of the disclosure, if necessary to increase the strength of the composite 30 against radial loads, fibers such as glass fibers may be circumferentially wound over the triaxially braided tube 340 or the biaxially woven fabric 410 after the tube 340 or fabric 410 has been placed around the radially outer surface of the liner 16 and the radially outer surface of the first and second pipes 12, 14.

Figure 5:
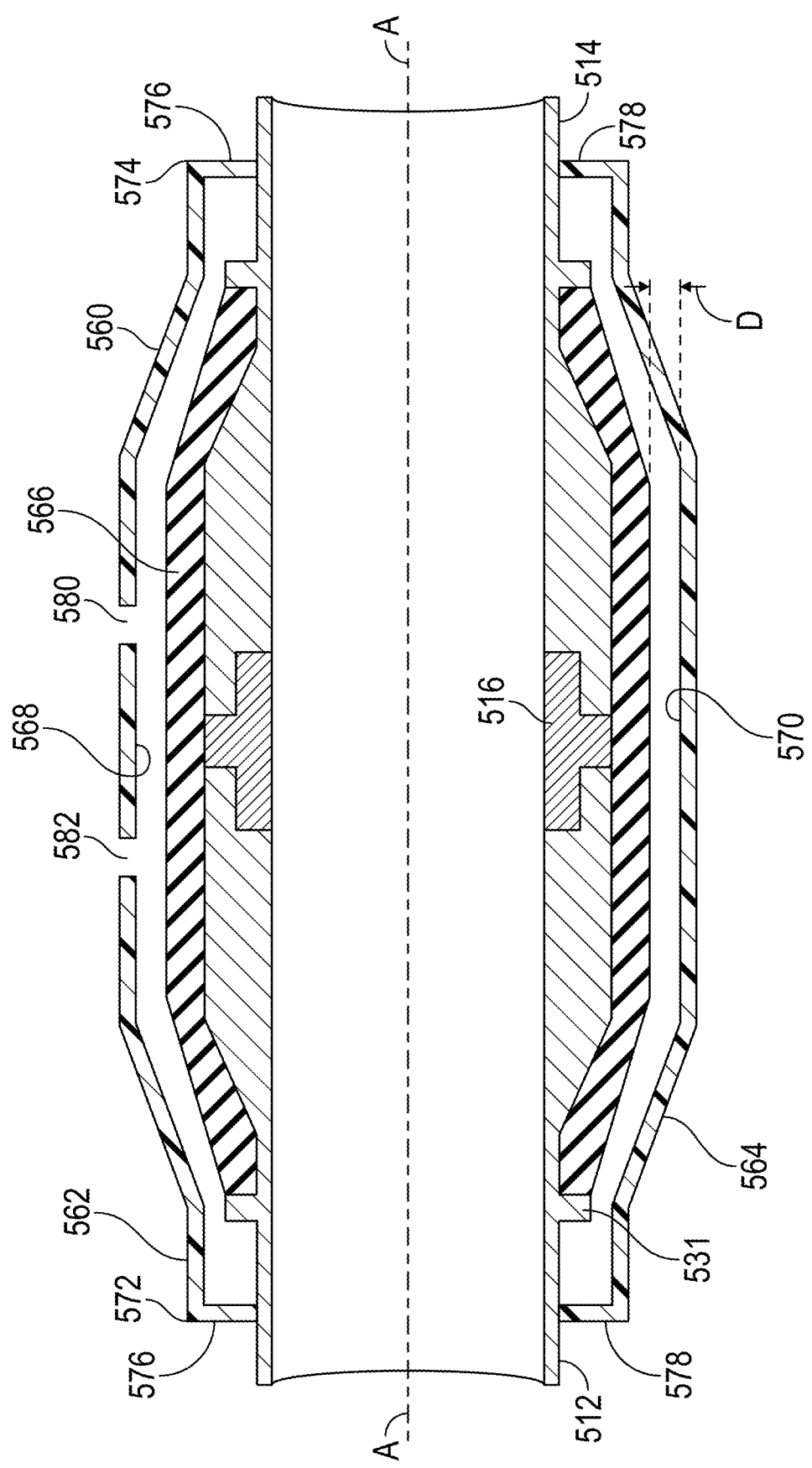
FIG. 5 is a cross sectional view of a mold for use in producing an electrical isolator according to the disclosure.

After the required arrangement of fibers (for example, comprising the triaxially braided tube 340 described above) has been placed around the radially outer surface of the liner 16 and the radially outer surface of the first and second pipes 12, 14, resin is then added to form the reinforcing composite material. In any example of the disclosure, a RTM technique may be used. As seen in FIG. 5, a two-part mold 560 may be provided. The two part mold 560 comprises a first half 562 and a second half 564, adapted to be placed around the 566, the radially outer surface of the liner 516 and the radially outer surface of the first and second pipes 512, 514 and to be joined together to form a mold which is substantially annular in cross section and sealed to the external environment. It will be understood that the mold could be made of more than two parts and could take any form to provide the required internal shape and working surfaces.

As seen in FIG. 5, the radially inner surfaces 568, 570 of the respective first half 562 and second half 564 provide a gap G between the two-part mold 560 and the fibers 566.

The radially inner surfaces 568, 570 of the respective first half 562 and second half 564 may be adapted to follow the shape of the radially outer surface 572 of the fibers 566 such that the distance D between the radially outer surface 572 of the fibers 566 and the radially inner surfaces 568, 570 of the respective first half 562 and second half 564 remains substantially constant over the longitudinal extent of the two-part mold 560. The two-part mold 560 is further adapted such that the mold extends longitudinally beyond the annular protrusions 531 on the first and second pipes 512, 514 and the fibers 566 around a portion of each of the first and second pipes 512, 514. The axial ends 572, 574 of the two-part mold 560 are closed by radially extending end faces 576, 578 of the respective first half 562 and second half 564. The first half 562 of the two-part mold 560 comprises an input channel 580 and a vent channel 582.

After the required arrangement of fibers 566 (for example, comprising the triaxially braided tube 340 described above) has been placed around the radially outer surface of the liner 516 and the radially outer surface of the first and second pipes 512, 514, the two part mold 560 is placed around the fibers 566, the liner 516 and the first and second pipes 512, 514. The mold 560 is then closed by bring the first and second halves 562, 564 together. The mould 560 is clamped shut and the interfaces between the end faces 576, 578 and the first and second pipes 512, 514 and between the first half 562 and second half 564 are sealed.

A vacuum is then applied to the vent channel 582 and a resin such as epoxy resin containing a carbon black additive is injected under pressure into the mold 560 through the input channel 580. The combination of injection under pressure and the vacuum applied to the vent channel 582 draws the resin longitudinally through the mold 560 such that it extends along the full longitudinal extent of the gap G and penetrates radially into the fibers 566 along the full longitudinal extent thereof.

In any example of the disclosure, quick or snap cure resins may be used to reduce the time required for curing the resin in the reinforcing composite material.

Heat is then applied to the mold 560 to cure the resin. This causes the fibers 566 and the resin to set into a solid reinforced composite component. The mold may then be unclamped and opened so that the isolator including the reinforced composite can be removed.

When penetrating through a mesh of fibers such as the fibers 566, the fibers may act to filter out the carbon black or other additive in the resin. This is not desirable as the conductive characteristics of the composite material may be caused to vary over the longitudinal extent thereof depending on the percentage of additive filtered out of the resin. Using the RTM method described above, the filtration effect of the fibers is minimized as the resin is distributed over the longitudinal extent of the mold before radially penetrating the fibers 566. This effect can be optimized by injecting the resin into the mold under pressure and/or by applying a vacuum to the mold.

In addition, using the RTM method described above, a smooth surface finish is formed on the radially outer surface of the reinforcing composite. This is a result of the radially inner surfaces 568, 570 of the mold 560 being smooth. The smooth surface finish is beneficial for the detection of BVID (Barely Visible Impact Damage). In contrast, the outer surface of reinforcing composite in an isolator formed by a traditional filament winding method would not be smooth and so BVID would be more difficult to detect.

Once cured, the reinforcing composite acts to hold the components of the electrical isolator 10 together to provide strength and resistance when high pressure fluids are passed through the electrical isolator 10.

The method may further comprise passing fluid through the electrical isolator 10, i.e. from the first pipe 12 to the second pipe 14 via the liner 16, at a pressure of greater than 1000, 2000 or 3000 psi. For safety in operation therefore, the electrical isolator 10 may be designed to withstand up to 20,000 psi internal pressure.

Although the present disclosure has been described with reference to various embodiments, it will be understood by those skilled in the art that various changes in form and detail may be made without departing from the scope of the disclosure as set forth in the accompanying claims.

The invention claimed is:

1. An isolator comprising:
   a first fluid-carrying member and a second fluid-carrying member spaced apart from the first fluid-carrying member;
   a resistive, semi-conductive or non-conductive component located between the first and the second fluid-carrying member, wherein the resistive, semi-conductive or non-conductive component is adapted to convey fluid flowing from the first fluid-carrying member to the second fluid-carrying member; and
   a reinforcing composite encircling the first fluid-carrying member, the second fluid-carrying member and the resistive, semi-conductive or non-conductive component, wherein the reinforcing composite comprises:
      first fibers extending at an angle of between −30 degrees and +30 degrees to a longitudinal axis of the resistive, semi-conductive or non-conductive component;
      second fibers interwoven with the first fibers and extending around the first fluid-carrying member, the second fluid-carrying member and the resistive, semi-conductive or non-conductive component at an angle of between +60 degrees and +90 degrees or between −60 degrees and −90 degrees to the longitudinal axis; and
      a resin;
      wherein the first fibers extend at an angle of between −5 degrees and +5 degrees to the longitudinal axis.

2. An isolator as claimed in claim 1, wherein the first fibers extend at angle of 0 degrees to the longitudinal axis.

3. An isolator as claimed in claim 1, wherein the first fibers extend substantially perpendicular to the second fibers.

4. An isolator as claimed in claim 1, wherein the first fibers and the second fibers form a triaxial braid.

5. An isolator as claimed in claim 3, wherein the second fibers comprise fibers extending at an angle of between +70 degrees and +80 degrees to the longitudinal axis and fibers extending at an angle of between −70 degrees and −80 degrees to the longitudinal axis.

6. An isolator as claimed in claim 1, wherein a radially outer surface of the reinforcing composite is substantially smooth.

7. A hydraulic or fuel system in an aircraft comprising an electrical isolator as claimed in claim 1.

8. A method of forming one or more electrical isolators, the method comprising:
   connecting a first fluid-carrying member to a second fluid-carrying member
   using a resistive, semi-conductive or non-conductive component such that the resistive, semi-conductive or non-conductive component is able to convey fluid flowing from the first fluid-carrying member to the second fluid-carrying member;
providing interwoven first fibers and second fibers extending around the first fluid-carrying member, the second fluid-carrying member and the resistive, semi-conductive or non-conductive component, wherein:
the first fibers extend around the first fluid-carrying member;
the second fluid-carrying member and the resistive, semi-conductive or non-conductive component at an angle of between −30 degrees and +30 degrees to a longitudinal axis of the resistive, semi-conductive or non-conductive component;
the first fibers extend at an angle of between −5 degrees and +5 degrees to the longitudinal axis; and
the second fibers extend around the first fluid-carrying member, and the second fluid-carrying member and the resistive, semi-conductive or non-conductive component at an angle of between +60 degrees and +90 degrees to the longitudinal axis or between −60 degrees and −90 degrees to the longitudinal axis;
adding a resin to the interwoven first fibers and second fibers; and
curing resin to form a reinforcing composite material.

9. A method as claimed in claim 7, wherein the providing interwoven first fibers and second fibers extending around the first fluid-carrying member, the second fluid-carrying member and the resistive, semi-conductive or non-conductive component comprises:
weaving the first fibers and the second fibers to form a mesh of interwoven fibers; and
wrapping the mesh of interwoven fibers around the first fluid-carrying member, the second fluid-carrying member and the resistive, semi-conductive or non-conductive component.

10. A method as claimed in claim 7, wherein the providing interwoven first fibers and second fibers extending around the first fluid-carrying member, the second fluid-carrying member and the resistive, semi-conductive or non-conductive component comprises:
braiding the first fibers and the second fibers to form a triaxially braided tube; and
placing the triaxially braided tube over the first fluid-carrying member, the second fluid-carrying member and the resistive, semi-conductive or non-conductive component, or
braiding the first fibers and the second fibers in situ to form a triaxially braided tube extending around the first fluid-carrying member, the second fluid-carrying member and the resistive, semi-conductive or non-conductive component.

11. A method as claimed in claim 10, further comprising providing a gap between an inner surface of the mould and the interwoven first and second fibres.

12. A method as claimed in claim 7, wherein the adding a resin to the interwoven first fibers and second fibers comprises:
placing a mold around the mesh of interwoven first and second fibers, the first fluid-carrying member, the second fluid-carrying member and the resistive, semi-conductive or non-conductive component; and
injecting a resin into the mold.

13. A method as claimed in claim 12, further comprising providing a substantially smooth inner surface on the mould such that a radially outer surface of the reinforcing composite material is substantially smooth.

14. A method as claimed in claim 12, wherein the resin is injected into the mould under pressure or under a vacuum.

15. A method as claimed in claim 7, further comprising winding third fibers around the interwoven first and second fibers prior to adding the resin, wherein the third fibers extend at an angle of between 80 and 100 degrees to the longitudinal axis.

* * * * *